US010788351B2

(12) United States Patent
Welle et al.

(10) Patent No.: US 10,788,351 B2
(45) Date of Patent: Sep. 29, 2020

(54) FILL LEVEL MEASUREMENT DEVICE COMPRISING A PLURALITY OF RADAR CHIPS

(71) Applicant: VEGA Grieshaber KG, Wolfach (DE)

(72) Inventors: Roland Welle, Hausach (DE); Joerg Boersig, Schapbach (DE); Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 16/142,846

(22) Filed: Sep. 26, 2018

(65) Prior Publication Data
US 2019/0107425 A1 Apr. 11, 2019

(30) Foreign Application Priority Data

Oct. 6, 2017 (EP) .................................. 17195221

(51) Int. Cl.
*G01F 23/284* (2006.01)
*G01S 13/88* (2006.01)
(Continued)

(52) U.S. Cl.
CPC ............ *G01F 23/284* (2013.01); *G01S 7/032* (2013.01); *G01S 13/87* (2013.01); *G01S 13/88* (2013.01); *G01F 22/00* (2013.01)

(58) Field of Classification Search
CPC ...................................................... G01S 13/38
(Continued)

(56) References Cited

U.S. PATENT DOCUMENTS

| 5,420,591 A * | 5/1995 | Annee .................. G01F 23/284 342/124 |
| 6,640,628 B2 * | 11/2003 | Lutke .................. G01F 23/284 340/624 |

(Continued)

FOREIGN PATENT DOCUMENTS

| DE | 10 2015 219 282 A1 | 4/2017 |
| DE | 102015219282 A1 | 4/2017 |

(Continued)

OTHER PUBLICATIONS

Extended European Search Report with English translation dated Apr. 10, 2018 in European Patent Application 17195221.1, citing documents AA, AB, AO-AR therein (20 pages).

*Primary Examiner* — Marcus E Windrich
(74) *Attorney, Agent, or Firm* — Oblon, McClelland, Maier & Neustadt, L.L.P.

(57) ABSTRACT

A fill level measurement device is provided, including a first radar chip and a second radar chip that is synchronised with the first radar chip, the first and second chips each include one or more transmission channels, each configured to radiate a transmission signal, and one or more reception channels, each configured to receive a reflected transmission signal from a filling material surface; an evaluation circuit, connected to the first and second chips by a data line assembly and being configured to calculate a fill level and/or a topology of the filling material surface of a medium in a container from reflected transmission signals received from the first and second chips; and a clock line assembly that connects the first chip to the circuit and is configured to provide the circuit with a common clock signal for evaluating the reflected transmission signals received from the first and second chips.

13 Claims, 4 Drawing Sheets

(51) Int. Cl.
*G01S 13/87* (2006.01)
*G01S 7/03* (2006.01)
*G01F 22/00* (2006.01)

(58) Field of Classification Search
USPC .......................................................... 342/124
See application file for complete search history.

(56) References Cited

U.S. PATENT DOCUMENTS

| | | | | |
|---|---|---|---|---|
| 6,759,977 | B1* | 7/2004 | Edvardsson | G01F 23/284 342/124 |
| 7,304,601 | B1* | 12/2007 | Edvardsson | G01F 23/284 342/118 |
| 7,589,665 | B2* | 9/2009 | Heide | G01S 13/003 342/127 |
| 7,619,558 | B2* | 11/2009 | Griessbaum | G01F 23/284 342/124 |
| 8,040,274 | B2* | 10/2011 | Wendler | G01F 23/284 324/364 |
| 9,024,808 | B2* | 5/2015 | Kleman | G01F 23/284 342/118 |
| 9,279,883 | B2 | 3/2016 | Ygnace et al. | |
| 9,389,309 | B2* | 7/2016 | Nakagawa | G01S 13/87 |
| 2005/0179584 | A1* | 8/2005 | Ohlsson | G01S 13/24 342/124 |
| 2009/0315758 | A1 | 12/2009 | Jirskog | |
| 2014/0208845 | A1 | 7/2014 | Zlotnick et al. | |
| 2015/0048963 | A1* | 2/2015 | Dieterle | G01S 13/88 342/5 |
| 2015/0226594 | A1* | 8/2015 | Frovik | G01S 7/40 342/124 |
| 2015/0338261 | A1* | 11/2015 | Mueller | G01S 13/34 342/124 |
| 2017/0141453 | A1 | 5/2017 | Waelde et al. | |
| 2018/0094962 | A1* | 4/2018 | Edvardsson | G01S 7/28 |
| 2018/0115409 | A1* | 4/2018 | Nayyar | G01S 13/87 |

FOREIGN PATENT DOCUMENTS

| | | |
|---|---|---|
| EP | 2 963 396 A1 | 1/2016 |
| EP | 3 171 138 A1 | 5/2017 |
| WO | WO 2015120883 | 8/2015 |
| WO | WO 2016/011407 A1 | 1/2016 |

* cited by examiner

FILL LEVEL MEASUREMENT DEVICE COMPRISING A PLURALITY OF RADAR CHIPS

CROSS-REFERENCE TO RELATED APPLICATIONS

This application claims the benefit of the filing date of European Patent Application No. 17 195 221.1, filed on 6 Oct. 2017, the entire content of which is incorporated herein by reference.

FIELD

The invention relates to fill level measurement and the recording of the topology of a filling material surface. In particular, the invention relates to a fill level measurement device comprising a first radar chip and a second radar chip that is synchronised with the first radar chip, to a method for measuring a fill level of the surface of a filling material in a container, to a program element, and to a computer-readable medium.

BACKGROUND

Fill level measurement using radar is known. In contrast with many other fields, the breakthrough for radar technology in fill level measurement was possible only once extremely small reflection signals could be recorded and processed by the electronics of the measurement devices.

Modern fill level measurement devices and topology measurement devices are characterised not only by a high transmission frequency, which may typically be in the range of 75 GHz to 85 GHz, but are also able to reliably process amplitude differences of the reflected signal in a range of up to 120 dB.

In order to generate and process the high-frequency transmission signals in the range of 79 GHz, a monolithic microwave integrated circuit (MMIC) may be provided. This component may comprise a plurality of transmission and reception channels, which are also referred to in this application as radar channels, in order that the filling material surface can be scanned.

The more precisely the filling material surface is to be scanned, the more transmission and reception channels are required in order to achieve a high-quality image, and this is associated with a correspondingly large outlay for hardware and a correspondingly high energy requirement.

SUMMARY

There may be a desire to provide a fill level measurement device for measuring a fill level of a medium or the topology of a medium in a container.

A first aspect relates to a fill level measurement device comprising a first radar chip and a second radar chip that is synchronised with the first radar chip. Both the first radar chip and the second radar chip comprise one or more transmission channels for radiating one transmission signal in each case towards the filling material surface, and one or more reception channels for receiving the transmission signals that are reflected at the filling material surface.

The radar chips may be microwave integrated circuits which can also be referred to as radar system-on-chip. A radar system-on-chip (RSoC) of this kind is a highly integrated MMIC comprising circuit components for digital functions and which, according to an embodiment, is able to integrate the entire functionality of a conventional radar system for signal generation, signal processing and conversion of the received signals, i.e., the reflected transmission signals, into a digital representation onto just one radar chip.

Each of the transmission channels may be designed to generate a high-frequency transmission signal having a frequency in the gigahertz range, for example in the range of 75 GHz to 85 GHz or above. The transmission channels may be designed as combined transceiver channels.

An evaluation circuit is provided, which is connected to the first and the second radar chips by means of a data line assembly and which is designed to calculate, to a high degree of accuracy and using as little power as possible, the fill level of the medium in the container and/or the topology of the filling material surface of the medium in the container from the transmission signals recorded by the first and the second radar chips.

Furthermore, a clock line assembly is provided, which connects the first radar chip to the evaluation circuit and which is designed to provide the evaluation circuit with a common clock signal for evaluating the reception signals of the first radar chip and the reception signals of the second radar chip.

A further aspect relates to a fill level measurement device comprising one or more radar chips and a clock circuit, which connects at least one of the radar chips to the evaluation circuit and supplies a common clock signal both to the radar chip and to the evaluation circuit in order to synchronise the radar chip and the evaluation circuit. Furthermore, a clock line assembly is provided, as well as one or more data line assemblies via which the measurement data of the radar chip can be transmitted to the evaluation circuit. All the lines (data and clock) are substantially the same length.

One embodiment relates to a fill level measurement device for recording fill level and/or topology, comprising at least N≥2 (N is a whole number) highly integrated radar chips, said at least N radar chips being connected to at least one evaluation circuit or evaluation unit, for example in the form of a processor, by means of at least N serial data lines for transmitting digital echo signals, the radar chips additionally being connected to the at least one evaluation line by means of M<N (M is a whole number) clock lines, also referred to in the following as clock line assemblies, for transmitting serial clock signals.

According to a further embodiment, the fill level measurement device comprises a clock circuit that is designed to provide a common clock signal to the first and the second radar chips in order to synchronise the two radar chips. In this case, fewer clocks are provided than radar chips, reducing the circuit complexity.

According to a further embodiment, the clock circuit comprises a single clock or oscillator for both the first and the second radar chip.

According to a further embodiment, the fill level measurement device comprises a plurality of radar chips, for example eight or more radar chips, a clock line assembly connecting the radar chip to the evaluation circuit in order to provide the evaluation circuit with a clock signal of the radar chip not being provided for every radar chip. Instead, said radar chip is synchronised with another radar chip of the fill level measurement device, such that the clock signal of the other chip can be used for signal processing while evaluating the measurement signals of said chip.

This also reduces circuit complexity.

According to a further embodiment, fewer clock circuits are provided than radar chips, as already mentioned above.

According to a further embodiment, the clock line assembly that connects the first radar chip to the evaluation circuit is of substantially the same length as the data line assembly that likewise connects the radar chip to the evaluation circuit and via which the measurement data of the chip are transmitted to the evaluation circuit.

In the context of the present disclosure, two line assemblies may be of the same length or substantially the same length when the signals transmitted via a first line assembly at a specifiable maximum frequency and the signals transmitted via a second line assembly at a specifiable frequency have a temporal offset, at the end of the relevant transmission path, of less than or equal to half the period of the largest transmitted signal frequency.

It is thus possible to use a clock circuit that provides a common clock signal to the first radar chip and to the evaluation circuit in order to synchronise the first radar chip and the evaluation circuit. The circuit complexity can be reduced in this manner.

According to a further embodiment, the fill level measurement device is designed as a fill level measurement device that uses a frequency-modulated continuous-wave signal (FMCW) for the measurement, each measurement cycle comprising a frequency sweep that has a starting frequency of 75 GHz and a maximum frequency of 85 GHz, for example.

According to a further embodiment, both the first and the second radar chips comprise an integrated analogue-to-digital converter that is designed to convert the reception signal into a digitised intermediate frequency signal, which is a result of one or more transmission signals that are reflected on the filling material surface.

According to a further embodiment, at least two of the transmission channels each comprise an antenna that is connected thereto.

According to a further embodiment, the first and the second radar chips are each based on BiCMOS technology.

According to a further embodiment, the radar chips are based on silicon-germanium SiGe technology.

According to a further embodiment, the radar chips are based on HF CMOS technology and therefore comprise high-frequency circuit parts for frequencies of 75 GHz and above.

According to a further embodiment, the fill level measurement device is designed for recording the topology of a medium in a container, i.e., is able to scan the filling material surface by means of digital beamforming.

The described embodiments relate to a method for measuring a fill level of a medium in a container or a topology of a surface of the medium in a container, in which method a first radar chip and a second radar chip are mutually synchronised. Both chips generate high-frequency transmission signals by means of one or more transmission channels in each case, and receive transmission signals reflected at the filling material surface by means of one or more reception channels. Said signals can be converted into digital intermediate frequency signals. For the purpose of signal processing, the first radar chip provides an evaluation circuit with a common clock signal for evaluating the reception signals of the two chips, and said evaluation circuit calculates the fill level and/or the topology of the medium in the container from the transmission signals recorded by the first and/or the second radar chips.

A further aspect relates to a program element, which, when executed on a processor of a fill level measurement device, instructs the fill level measurement device to carry out the steps described above and in the following.

A further aspect relates to a computer-readable medium, on which the above-described program element is stored.

The properties described in the following with regard to the fill level measurement device can also be implemented as method steps. Vice versa, all the method steps described in the following can be implemented in the fill level measurement device.

BRIEF DESCRIPTION OF THE FIGURES

In the following, embodiments are described in detail with reference to the accompanying drawings. In the following drawings, like reference signs denote like or similar elements.

The views in the drawings are schematic and not to scale.

DETAILED DESCRIPTION OF EMBODIMENTS

In many fields of bulk material measurement, fill level measurement devices that record the topology of a filling material lead to significantly improved measurement results, and are therefore increasingly used for reliable and accurate monitoring of bulk materials. Furthermore, as a result of new developments, highly integrated radar chips are available, by means of which it is possible to make the system architecture of imaging radar sensors in the field of fill level measurement simpler and cost-effective.

Figure 1:
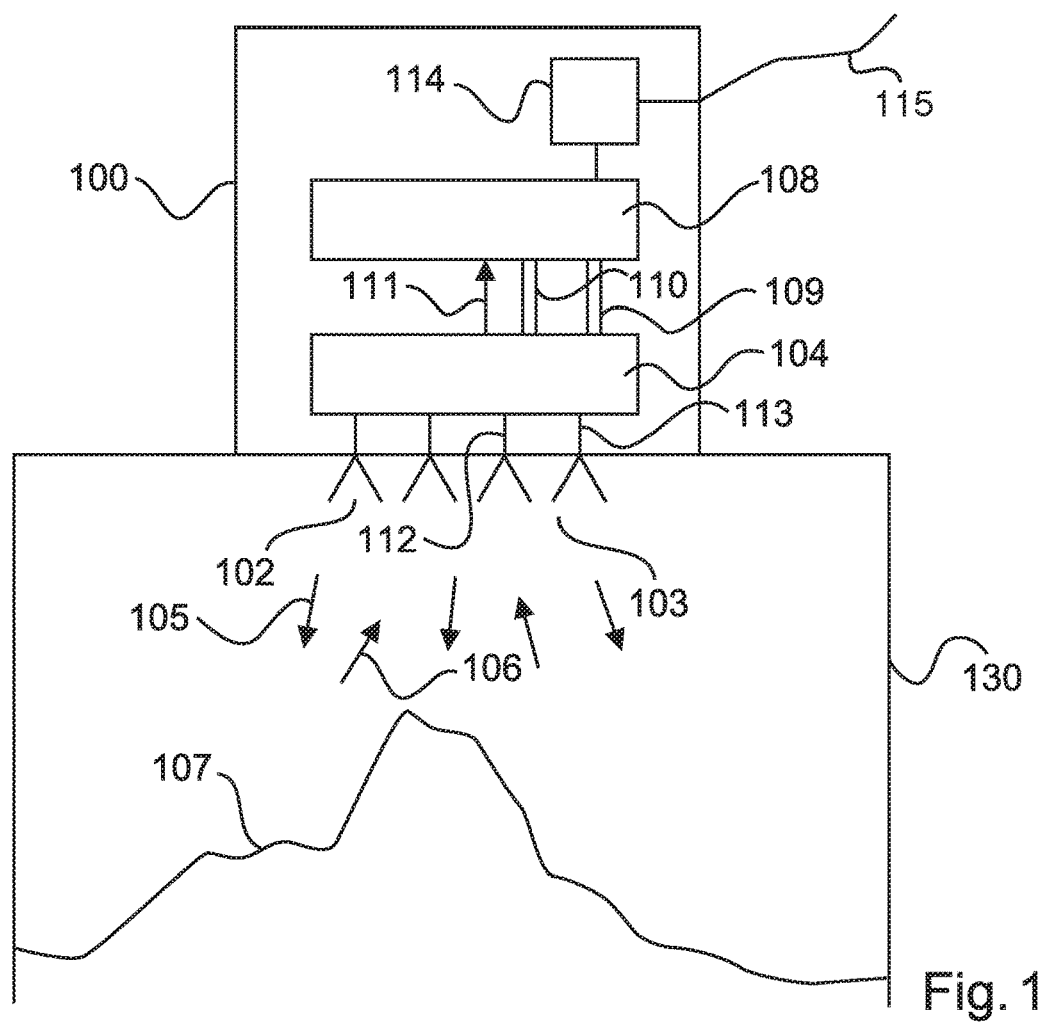
FIG. 1 shows a fill level measurement device that is installed in a container and is for recording the topology of the surface of a filling material in the container.

FIG. 1 shows a first embodiment of a fill level measurement device 100 that records topology, comprising a radar chip 104 that is installed in or on a container 130. Using circuit components (PLL, VCO, amplifier) installed in the radar chip 104, the chip generates a radar signal 105 that is radiated towards a filling material surface 107 by means of at least one system antenna 102 that is connected to the chip. The radar signal 105 is reflected as a reflected signal 106 by said surface and is conducted back to the radar chip 104 by means of at least one reception antenna 103. In the radar chip 104, the reflected signal 106 is first converted into a low-frequency range using specific circuit components (mixer, amplifier, coupler) and is subsequently converted into a digital image by means of one or more analogue-to-digital converters integrated in the radar chip 104.

Since, in the field of fill level measurement, limited power in the device 100 should always be assumed, no data is stored in the radar chip 104 since, in the past, the memory contents would be lost upon deactivation of the chip following a completed measurement. Therefore, in current system designs, the recorded data of the analogue-to-digital converters integrated in the chip 104 are transmitted in real time to an external evaluation unit 108. Such radar chips 104 may be used by way of example for the automotive field, with the result that measurement cycles in very rapid succession are provided in order to monitor very fast-moving objects.

The analogue-to-digital converters are therefore clocked so as to be relatively rapid (typically 10 MHz . . . 100 MHz). In order to be able to transfer the recorded digital values at this speed to an external signal evaluation unit, high-speed serial data transmission lines 109, 110 are therefore usually used, in combination with an additional data clock line 111. In order to increase the resistance to interference, both the data lines 109, 110 and the clock line 111 may be differential.

In the example in FIG. 1, the radar chip 104 comprises precisely two reception channels 112, 113. The data of said channels are transmitted to the evaluation unit 108 by means of one data line 109, 110 in each case. In this case, an SPI standard, an LVDS standard or another serial transmission standard may be used. The additional clock line 111 allows the evaluation unit 108 to correctly interpret the serial data stream and to store the transmitted data in the memory of the evaluation unit 108. The entire system is supplied with power by means of a power supply unit 114, which is depicted in FIG. 1 as connected to a power supply wire 115. Specialised processors, which comprise the appropriate interfaces (clock input, a plurality of SPI or LVDS inputs) for connecting a radar chip 104 are possible as the evaluation unit 108. However, it is also possible to form the evaluation unit 108 within a correspondingly programmed FPGA or an ASIC.

Figure 2:
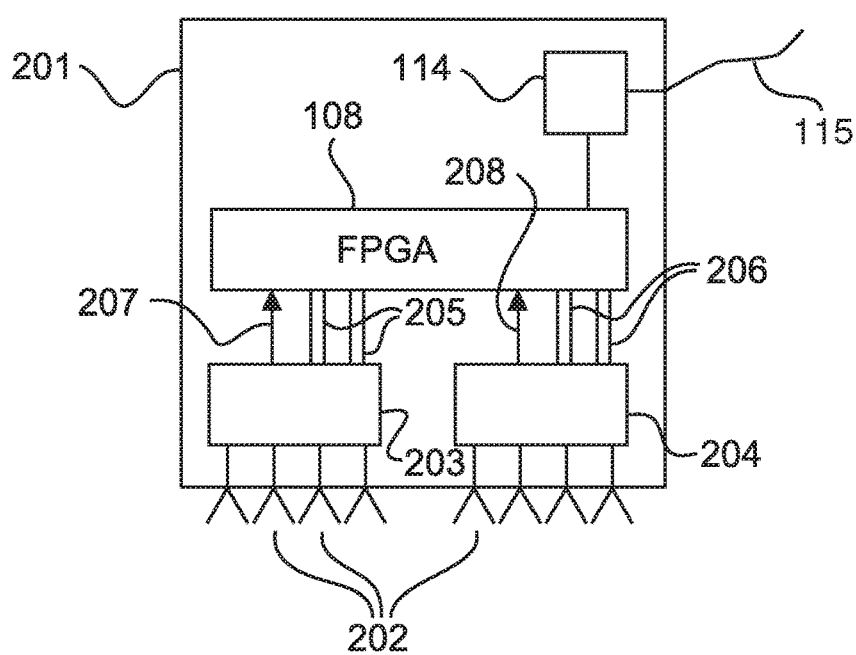
FIG. 2 shows a further fill level measurement device.

In contrast to detection applications in the automotive field, the focus of developments in the field of fill level measurement is on higher imaging quality of continuously distributed individual reflectors of a bulk material surface. Current research efforts therefore relate to increasing the imaging quality of bulk material measurement devices for recording the topology. This is possible by increasing the number of antennae used, as can be seen in FIG. 2. The measurement device 201 in FIG. 2 comprises a plurality of radar chips 203, 204, which are in turn connected to a plurality of transmission and reception antennae 202. When recording the measurement data, it is necessary to read the data recorded by the radar chips 203, 204 into the evaluation unit 108 in real time. The serial data streams on data lines 205, 206 provided by the radar chips therefore have to be connected to a plurality of inputs of the evaluation unit.

In addition, each of the radar chips 203, 204 delivers a clock signal on clock lines 207, 208, the clock signal being associated with the serial data stream and has to be processed by the evaluation unit 108.

The above-mentioned system architecture can in principle also be used for implementing radar systems comprising a plurality of radar chips, such as radar chips 104, 203, 204. However, it can clearly be seen that the number of lines for transmitting the echo data from the radar chips to the evaluation unit increases very significantly when the number of radar chips is increased. Previously available processors for connecting external radar chips only allow for system architectures comprising up to two radar chips 203, 204.

It is therefore desirable to achieve a system architecture by means of which a plurality of radar chips, for example 8 radar chips, can be connected to one evaluation unit 108.

A first solution may consist in implementing the evaluation unit in a correspondingly large evaluation unit 108, such as a FPGA. Managing a plurality of serial high-speed interfaces is possible when a sufficient number of logic cells is provided. However, the FPGA must in addition comprise sufficient 10 pings and/or PLLs for clock synchronisation in order to read in the signals of the plurality of clock and data lines 205, 206, 207, 208 from the plurality of radar chips 203, 204. Therefore, in the present maximum structure, given by way of example, comprising 8 radar chips having 4 reception channels in each case, it must be possible to connect 32 differential data lines and 8 differential clock lines. The FPGA therefore has to comprise at least 80 IO pins for free programming in order to read in the data of the chips. It is therefore not possible to use cheap chips, and this may lead to correspondingly higher system costs.

Figure 3:
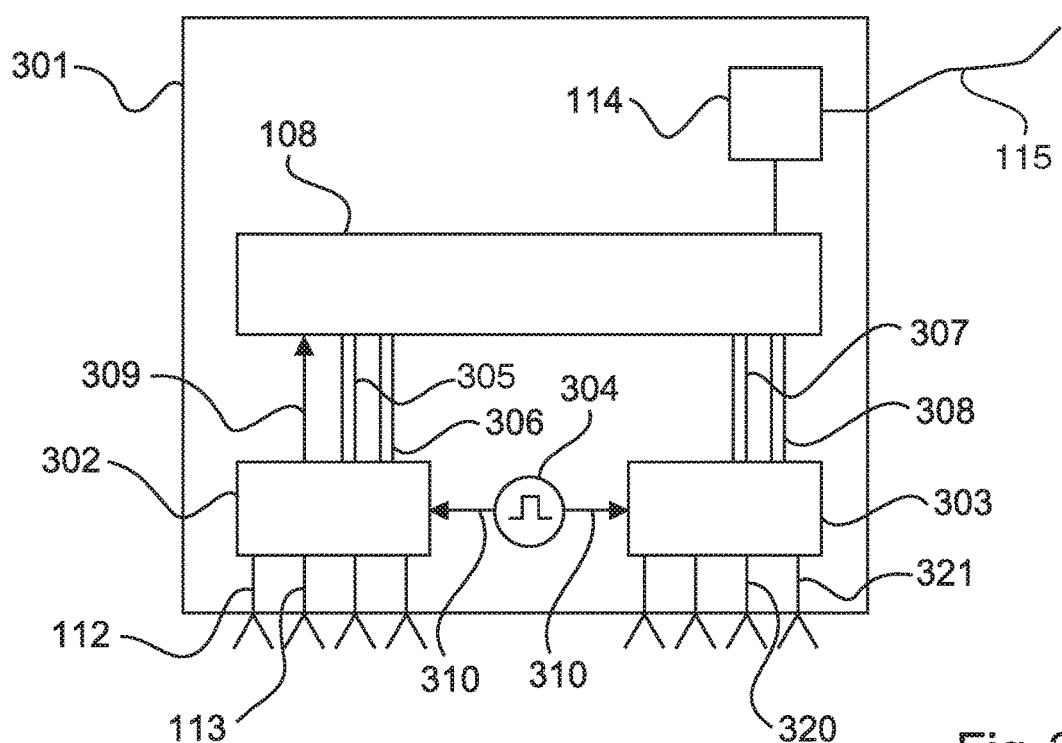
FIG. 3 shows a further fill level measurement device.

FIG. 3 therefore shows a second solution to the problem. The basic concept of this solution may be considered that of synchronising the radar chips 302, 303 used in the system 301 by means of a common system clock pulse assembly 304. The digital modules within the radar chip, and in this case in particular the analogue-to-digital converter, therefore operate completely synchronously, as a result of which the data stream in high-speed serial data transmission lines 305, 306, 307, 308 delivered thereby also arrives at the input of the evaluation unit 108 in a completely synchronised manner. In order to interpret the synchronous data streams, it is therefore sufficient to transmit the serial data clock pulse of a single radar chip 302 to the evaluation unit 108 via clock line 309. It should be added at this point that, according to the described embodiments, the common system clock pulse of the radar chips 302, 303 is intended to be applied substantially synchronously to the inputs of the radar chips 302, 303. It may therefore be necessary to design the clock lines 310 such that the electrical transit time or length thereof is substantially the same. It may also be necessary to initially conduct the signals together, and to divide said signals on the path between the common system clock pulse assembly 304 and the radar chips 302, 303. It may be necessary to amplify or adapt the level of the clock pulse by inserting an amplifier element between the common system clock pulse assembly 304 and the radar chips 302, 303, for example, by means of a correspondingly designed resistor network. It is also possible to wire the clock and data lines 305, 306, 307, 308, 309 such that the electrical transit time of said lines is substantially identical.

It is also possible for the common system clock pulse assembly 304 to be contained within a first radar chip 302. It is possible for said first radar chip to provide the other radar chip 303 with a system clock pulse generated by the common system clock pulse assembly 304 or with clock pulses derived therefrom.

Figure 4:
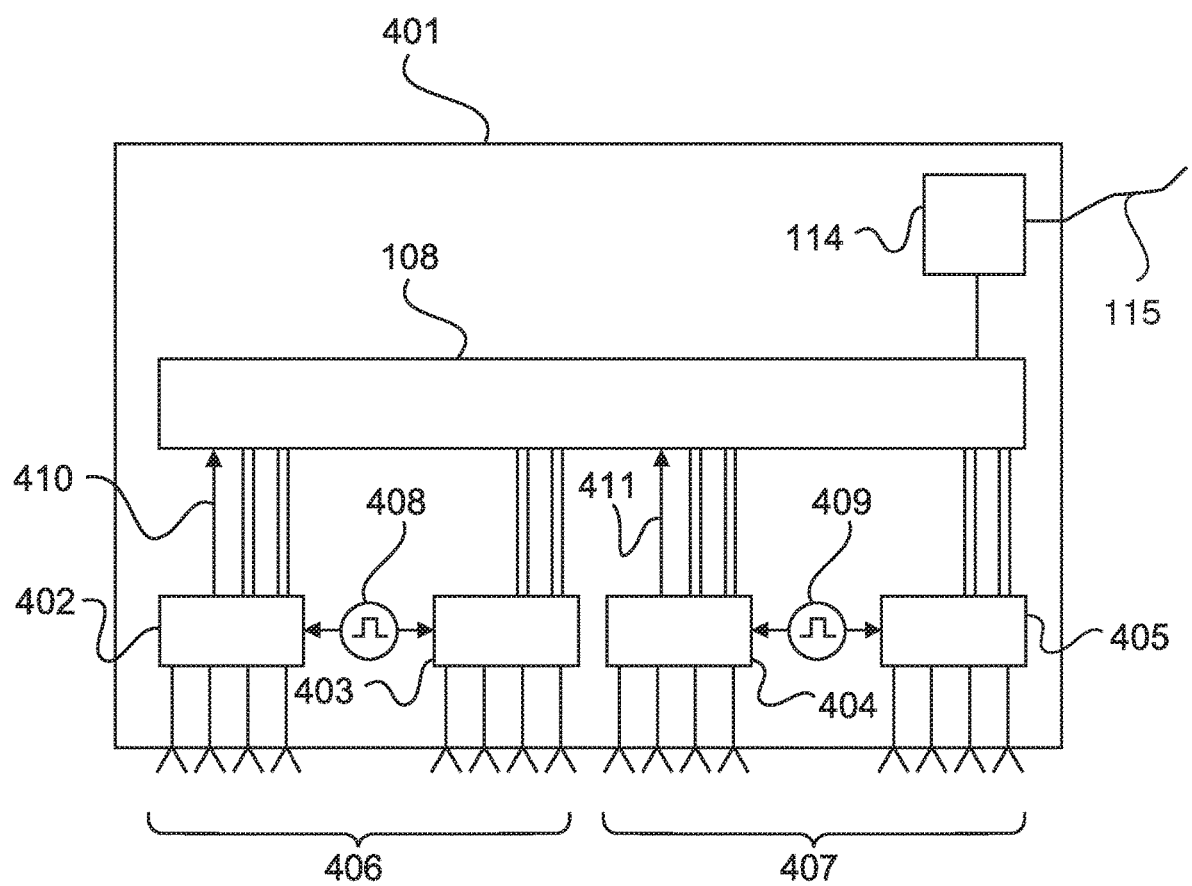
FIG. 4 shows a further fill level measurement device.

In the case of larger radar systems, distributing a single system clock oscillator signal may lead to problems in the layout. FIG. 4 therefore shows a further embodiment of a fill level measurement device 401 for recording topology. The radar chips 402, 403, 404, 405 can also be divided into a plurality of subgroups 406, 407. In each of said subgroups, the associated radar chips have to be synchronised by means of common oscillators 408, 409. In order to connect the radar chips to a common evaluation unit 108, it is then sufficient to transmit at least one serial high-speed clock pulse to the evaluation unit 108 on clock lines 410, 411 for each subgroup 406, 407.

It is also possible for at least one of the common oscillators 408, 409 to be contained within a first radar chip 402, 404. It is possible for said first radar chip to provide the other radar chip 403, 405 with a system clock pulse generated by the common oscillator 408, 409 or with clock pulses derived therefrom.

Figure 5:
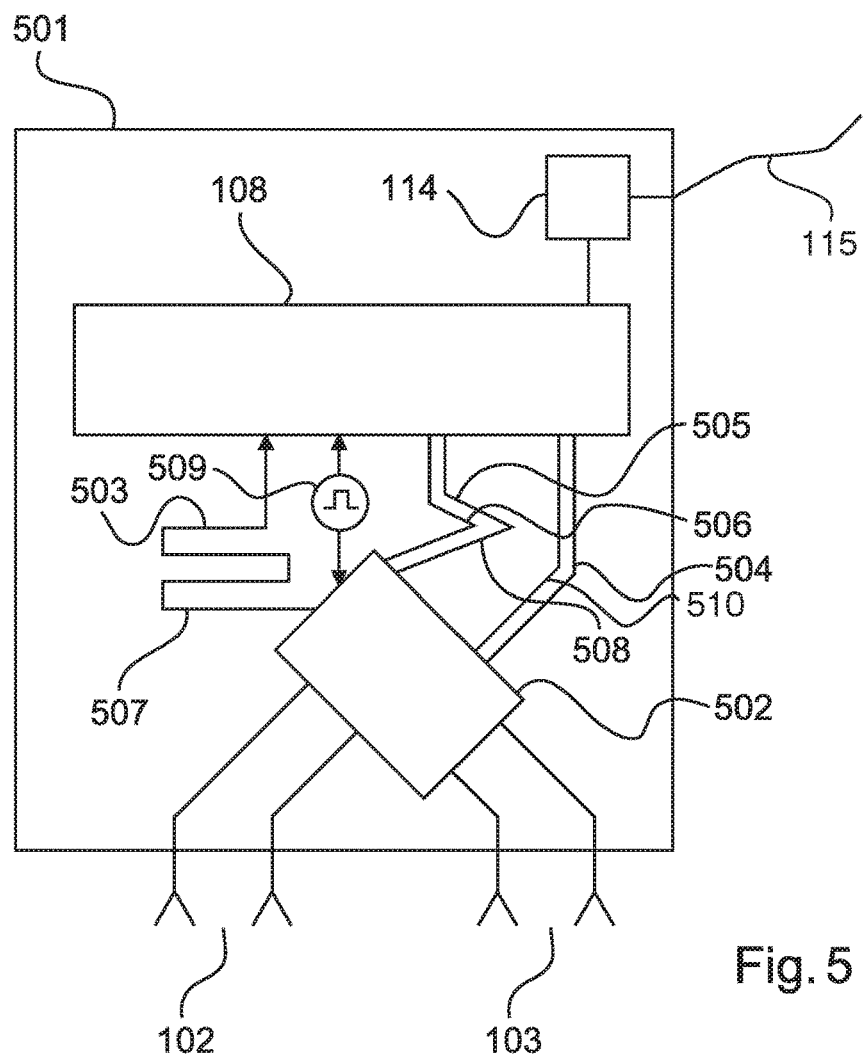
FIG. 5 shows a further fill level measurement device.

FIG. 5 shows a further design of a fill level measurement device 501. The radar chip 502 differs from the chips 104, 203, 204, 302, 303, 402, 403, 404, 405 considered thus far by way of a different position of the terminals for the serial high-speed data. It should be noted in this case that the serial data and clock signals emitted by the radar chip 502 can be received substantially synchronously at the evaluation unit 108, taking into account the data clock rate. Therefore, in the present example, the clock line 503 is lengthened using corresponding lengthening structures 507 such that the transit time of the clock signals transmitted thereby is substantially identical to the transit time of the data signals on the data lines 504, 505, 506, 510. It is also possible for the data lines to comprise corresponding transit time compensation paths 508. It is furthermore provided for the corresponding line parts 505, 506 to be of substantially the same electrical length in the case of differential signals.

FIG. 5 furthermore shows an addition that is advantageous in terms of electromagnetic compatibility (EMC) technology. It is possible to supply the evaluation unit 108 and at least one radar chip 502 by means of a common clock generator 509 and to synchronise the processing units in this respect. The clock generator 509 may be implemented as a separate component, within the evaluation unit 108 or within a radar chip 502.

Figure 6:
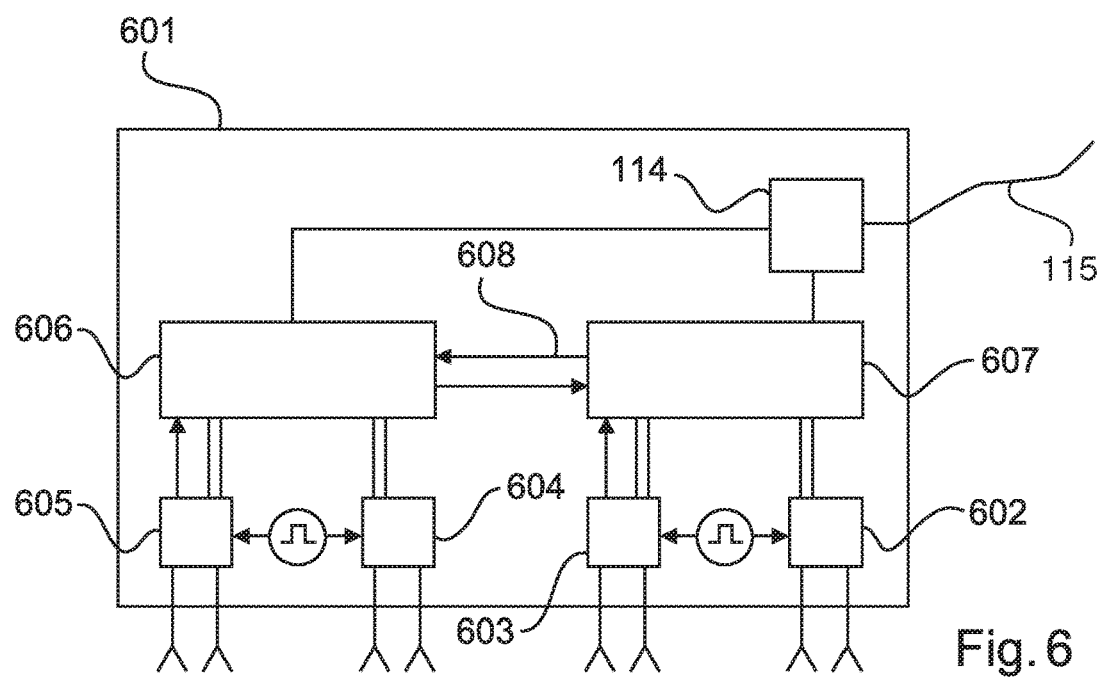
FIG. 6 shows a further fill level measurement device.

FIG. 6 shows a further alternative for evaluating the signals of a plurality of radar chips 602, 603, 604, 605. In this case, the radar chips 602, 603 are connected to a first evaluation unit 607, for example a first FPGA. The radar chips 604, 605 are connected to a second evaluation unit 606. It is possible for the first evaluation unit 607 to be configured as a master unit and to in particular implement the control of the operation of the measurement device 601. It is possible for the first evaluation unit 607 and the second evaluation unit 606 to be interconnected by means of communication lines 608. It is in particular provided for the evaluation unit 607 to request the raw data and/or preprocessed data from the evaluation unit 606 in order to process said data in conjunction with the data it has recorded itself. It is possible for the evaluation unit 607, the evaluation unit 606, and/or at least one of the radar chips 602, 603, 604, 605 to be switched to a power-saving state after a measurement data recording cycle has been completed. In this case, the evaluation unit 607 and the other components may be interconnected by means of control lines (not shown).

Figure 7:
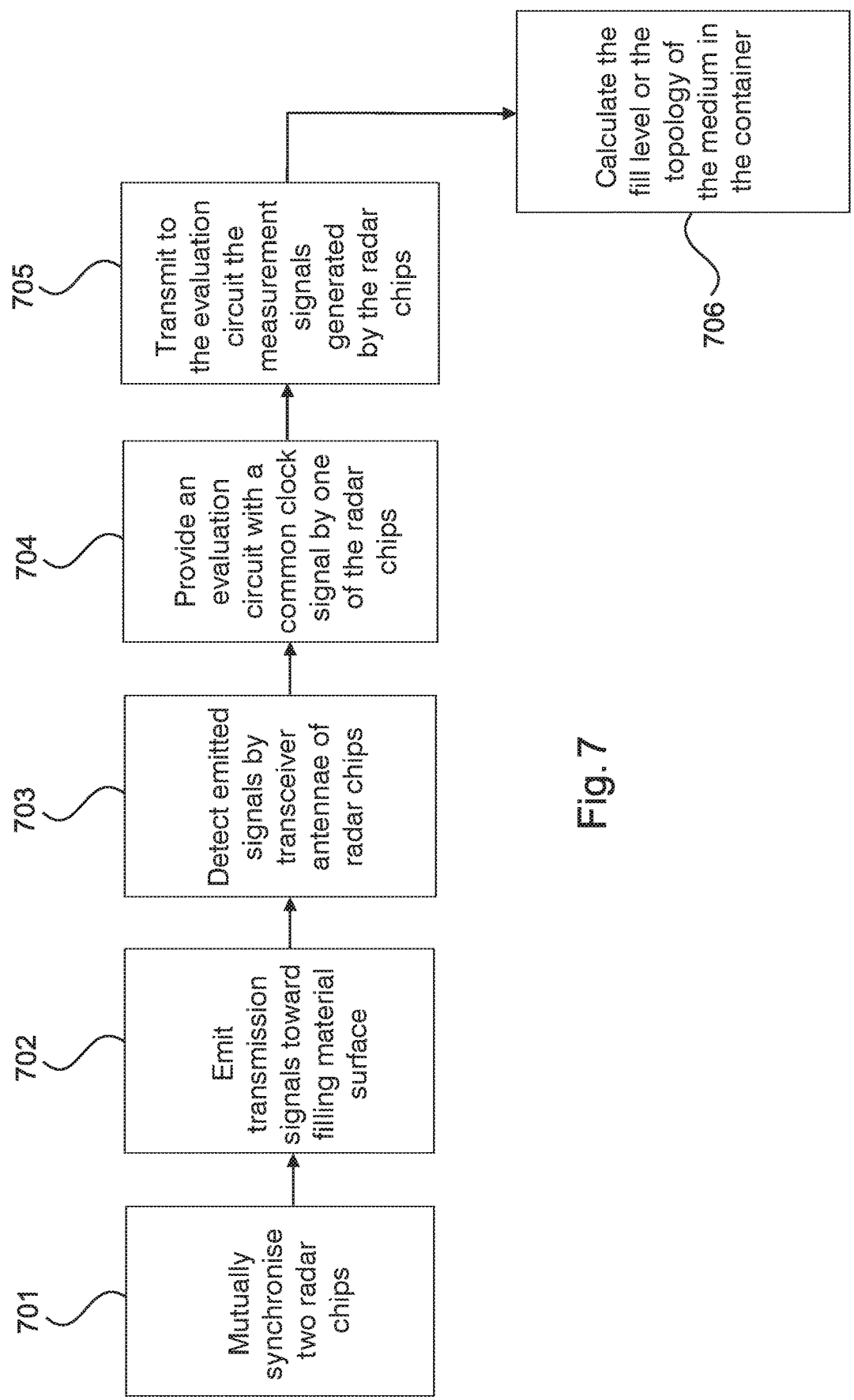
FIG. 7 is a flow chart of the method according to an embodiment.

FIG. 7 is a flow chart of a method according to an embodiment. In step 701, two radar chips are mutually synchronised. In step 702, the radar chips emit transmission signals towards the filling material surface, which signals are reflected there and are detected by the transceiver antennae of the radar chips in step 703. In step 704, one of the radar chips provides an evaluation circuit with a common clock signal, and in step 705 the measurement signals generated by the radar chips are transmitted to the evaluation circuit, which calculates therefrom, in step 706, the filling level or the topology of the medium in the container.

For the sake of completeness, it should be noted that "comprising" and "having" do not exclude the possibility of other elements or steps, and "one" or "a" does not exclude the possibility of a plurality. It should further be pointed out that features or steps described with reference to one of the above embodiments may also be used in combination with other features or steps of other above-described embodiments. Reference signs in the claims should not be treated as limiting.

We claim:

1. A fill level measurement device, comprising:
   a first radar chip and a second radar chip that is synchronised with the first radar chip, the first and the second radar chips each comprise one or more transmission channels, each configured to radiate a transmission signal, and one or more reception channels, each configured to receive a reflected transmission signal from a filling material surface;
   a clock circuit comprising a common system clock pulse assembly, by means of which the first radar chip and the second radar chip are connected and a common clock signal is provided to the first radar chip and to the second radar chip to synchronise the first radar chip and the second radar chip, and a clock line assembly that connects the first radar chip to an evaluation circuit and that is designed to provide the evaluation circuit with the common clock signal for evaluating the reflected transmission signals received from the first radar chip and the reflected transmission signals received from the second radar chip;
   the evaluation circuit, which is connected to the first and the second radar chips by a data line assembly and to which the measurement data of the first and the second radar chips are transmitted via the data line assembly, and being configured to calculate a fill level and/or a topology of the filling material surface of a medium in a container from reflected transmission signals received from the first and the second radar chips; and
   wherein the fill level measurement device comprises a plurality of radar chips including the first and the second radar chips,
   wherein no clock line assembly connects the second radar chip to the evaluation circuit,
   wherein the second radar chip, for which no clock line assembly is provided, is synchronised with the first radar chip by means of the common clock signal of the clock circuit, and
   wherein the measurement data of the first and the second radar chips are transmitted to the evaluation circuit in a completely synchronised manner.

2. The fill level measurement device according to claim 1, wherein the clock circuit comprises a single clock for both the first and the second radar chips.

3. The fill level measurement device according to claim 1, wherein the fill level measurement device comprises a plurality of radar chips including the first and the second radar chips, and
   wherein fewer clock circuits than radar chips are provided.

4. The fill level measurement device according to claim 1, wherein the clock line assembly is a same length as the data line assembly.

5. The fill level measurement device according to claim 4, further comprising:
   a clock circuit configured to provide a common clock signal to the first radar chip and to the evaluation circuit, and to synchronise the first radar chip and the evaluation circuit.

6. The fill level measurement device according to claim 1, wherein the fill level measurement device is configured as a frequency-modulated continuous-wave signal (FMCW) fill level measurement device.

7. The fill level measurement device according to claim 1, wherein the first and the second radar chips each comprise at least one integrated analogue-to-digital converter configured to convert the reflected transmission signal into a digitised intermediate frequency signal.

8. The fill level measurement device according to claim 1, being configured to record the topology of the medium in the container.

9. A method for measuring a fill level of a medium in a container and/or a topology of a surface of the medium, comprising:
   synchronising a first radar chip and a second radar chip by providing a common clock signal to the first radar chip and to the second radar chip by means of a common system clock pulse assembly of a clock circuit;

generating a high-frequency transmission signal by at least one transmission signal among a plurality of transmission signals of the first radar chip and of the second radar chip;

receiving at least one reflected transmission signal from the filling material surface by a plurality of reception channels of the first radar chip and of the second radar chip;

providing an evaluation circuit with common clock signal via a clock line assembly of the clock circuit, by the first radar chip, and transmitting the measurement data of the first and the second radar chips to the evaluation circuit via the data line assembly, to evaluate the at least one reflected transmission signal received from the first radar chip and the second radar chip; and calculating the fill level and/or the topology of the surface of the medium in the container from the at least one reflected transmission signal received from the first and the second radar chips, wherein the fill level measurement device comprises a plurality of radar chips including the first and the second radar chips, wherein no clock line assembly connects the second radar chip to the evaluation circuit, wherein the second radar chip, for which no clock line assembly is provided, is synchronised with the first radar chip by means of the common clock signal of the clock circuit, and wherein the measurement data of the first and the second radar chips are transmitted to the evaluation circuit in a completely synchronised manner.

10. A nontransitory computer-readable storage medium having a program stored therein, which, when executed on a processor of a fill level measurement device, causes the fill level measurement device to perform a method according to claim 9.

11. The fill level measurement device according to claim 1, wherein the clock line assembly and the data line assembly are different and of substantially the same length.

12. The fill level measurement device according to claim 1, wherein the clock circuit is configured to synchronise the first and the second radar chips and the evaluation circuit by means of the clock line assembly and the common system clock pulse assembly.

13. The fill level measurement device according to claim 1, wherein the common system clock pulse assembly is contained within a first radar chip, or wherein the common system clock pulse assembly is configured to divide the common clock signal on a path between the common system clock pulse assembly and the first and the second radar chips.

* * * * *